United States Patent

[11] 3,607,435

| [72] | Inventors | Richard J. Charles<br>Schenectady;<br>Stephan P. Mitoff, Elnora; William G.<br>Morris, Schenectady, all of N.Y. |
|---|---|---|
| [21] | Appl. No. | 885,960 |
| [22] | Filed | Dec. 17, 1969 |
| [45] | Patented | Sept. 21, 1971 |
| [73] | Assignee | General Electric Company |

[54] METHOD OF MAKING SINTERED BETA-ALUMINA BODIES
9 Claims, No Drawings

[52] U.S. Cl..................................................... 136/153, 106/65
[51] Int. Cl............................................... H01m 41/02
[50] Field of Search.......................................... 136/153; 106/39, 58, 65; 252/518, 521

[56] References Cited
UNITED STATES PATENTS

| 3,026,210 | 3/1962 | Coble........................... | 106/39 R |
| 3,432,314 | 3/1969 | Mazdiyasni et al............ | 106/39 R |
| 3,458,356 | 7/1969 | Kummer et al................ | 136/153 |
| 3,499,796 | 3/1970 | Hever et al.................... | 136/153 |

*Primary Examiner*—Donald L. Walton
*Attorneys*—Richard R. Brainard, Paul A. Frank, Charles T. Watts, Frank L. Neuhauser, Oscar B. Waddell and Joseph B. Forman

ABSTRACT: Sintered beta-alumina bodies specially suited for use as solid electrolytes are prepared through the use of alpha-alumina with sodium meta-aluminate as a binder for the formation of green bodies of good strength and as a source of sodium oxide for reaction with the alpha-alumina to produce sodium beta-alumina during the sintering operation.

METHOD OF MAKING SINTERED BETA-ALUMINA BODIES

The present invention relates generally to ceramics and is more particularly concerned with a new method of making sintered beta-alumina bodies by forming green bodies of alpha-alumina with a binder which in the subsequent firing operation reacts with the alpha-alumina to produce the desired products.

Solid electrolytes afford the opportunity of constructing electrical energy storage devices in a variety of combinations of electrode materials useful over a broad range of operating temperature conditions. Thus, for example, a high-energy battery has been built in which the anode is sodium and the cathode is sulfur and both the sodium and sulfur are in the molten state at operating temperature and are in contact with and separated by an electrolyte of sodium beta-alumina. Cells of this type have the prospect of large-scale use because of their high-energy content and because it now is possible to make beta-alumina electrolyte bodies having good electrical conductivity. The invention enabling this result is disclosed and claimed in copending application Ser. No. 885,961, filed of even date herewith in the names of Richard J. Charles, Stephan P. Mitoff and William G. Morris and assigned to the assignee hereof.

The fabrication of these electrolyte bodies, however, has presented some difficulties particularly in respect to providing mixtures of the proper plasticity and tackiness for forming green bodies of good strength. Certain organic binders such as polyvinyl alcohol have been used for this purpose but the proportions required are large enough to detrimentally affect the characteristics of the ultimate sintered electrolyte bodies.

We have discovered that green bodies having good compaction and handling characteristics enabling their processing to the final sintered condition in high yields can be produced through the use of alpha-alumina and sodium meta-aluminate and without organic binder or with an amount of such binder small enough that any detrimental effect of it is negligible. Moreover, we have discovered that a reaction takes place between the sodium meta-aluminate and the alpha-alumina during the sintering operation which yields beta-alumina so that the finished product has the desired electrolytic characteristics as well as the required physical form and integrity. Still further, we have found that any tendency for the sodium aluminate to emerge from the sintering operation in the form of discrete particles in the resulting sodium beta-alumina body and can be eliminated by dissolving the sodium meta-aluminate in the water to be used to plasticize the mixture and then mixing this solution with the alpha-alumina powder. Also, there is a tendency for this dissolved sodium meta-aluminate to precipitate in the interstices of the alpha-alumina grains during initial drying of the green bodies which results in greater green density than that exhibited by green bodies prepared by mixing the sodium meta-aluminate and the alpha-alumina in dry powder form.

This invention opens opportunities not previously available in respect to the shapes in which the beta-alumina electrolyte bodies may be made. Thus, because of the plastic nature and workability of the sodium meta-aluminate and alpha-alumina mixture and the fact that the solid particles of the mixture are preferably all of size less than one micron, green bodies can readily be made in the form of closed-end tubes, or as "U" tubes or helixes. Additionally, the uniformity of the desired electronic characteristics of the ultimate beta-alumina bodies made by sintering such green bodies can be assured by adding the magnesium or yttrium requirements in soluble form such as the chloride and dissolving these compounds in the sodium meta-aluminate solution before mixing it with the alpha-alumina powder.

The process of the present invention based upon these discoveries, described in brief, comprises the steps of preparing a substantially uniform, moist mixture of sodium meta-aluminate and alpha-alumina in powder form, compacting this mixture to form a green body, and firing the green body in a dry, free oxygen-containing atmosphere at a temperature from 1600 to 1900° C. Preferably, in the production of beta-alumina electrolyte bodies having uniformly good conductivity, magnesium chloride and yttrium chloride are incorporated in the mixture prior to forming the green body, preferably by dissolving these chlorides in a water solution of the sodium aluminate. Alternatively, magnesium and yttrium ions may be added to the mixture in the form of minus 325-mesh particles of magnesia and yttria being incorporated at the preliminary powder-mixing stage and being used in amounts of from one to three percent and from 0.25 to 5 percent, respectively. It is also preferably to use alpha-alumina of particle size less than one micron and to carry out the sintering operation in an atmosphere of air oxygen of dew point below −80° F. The preferred firing temperature is about 1825° C. and the period is about 2 hours.

This invention also contemplates the use of sodium meta-aluminate in the processing of foams. In such an operation, the meta-aluminate would be employed instead of aluminum phosphate, particularly where the foam is intended to have electrical properties which the presence of a substantial amount of phosphate ion would preclude.

In carrying out the process of this invention to produce tubular bodies of beta-alumina suitable for use as electrolytes in a sodium-sulfur cell, sodium meta-aluminate ($Na_2O \cdot Al_2O_3 \cdot 3H_2O$) is mixed with alpha-alumina and magnesia and yttria in the presence of water and a suitable organic binder. All the solids are in the form of powders of particle size less than 325-mesh (U. S. Standard) and they are used in the following proportions:

Linde A alumina 78 percent (Product of Union Carbide Co.) $Na_2O \cdot Al_2O_3 \cdot 3H_2O$ 19 MgO 2 $Y_2O_3$ 1

Polyvinyl alcohol (PVA) is used as the organic binder, being added in the proportion of 640 cc. of 10 percent PVA in water for the above powder mixture aggregating 1160 grams. After blending the resulting mixture to forming consistency, it is extruded to produce green bodies in tubular form which, after air-drying at room temperature for a few hours, are fired at 1825° C. for two hours in dry oxygen (dew point below −80° F.) to produce modified beta-alumina bodies of full density (about 3.08 grams per cc.) having an electrical conductivity of 5 to 10 ohm²-centimeters at 300° C.

Alternatively, using the batch composition stated above, the sodium meta-aluminate in first dissolved in about 90 percent of the water (30° C.) required to produce the extrusions consistency and the resulting solution, free of organic binder, is then mixed with the remaining powders in a blender. A small amount of water is added in the final stages of the blending operation to establish the desired extrusion consistency and then the mixture is extruded to produce the green body tubes. After air-drying these tubes long enough that the sodium meta-aluminate sets up to impart the desired green strength for handling and the subsequent sintering operation, the green bodies are fired at 1825° C. for two hours in air with the result that a fully-dense, beta-alumina electrolyte in tubular form is obtained having an electrical conductivity from 5 to 10 ohm-centimeters at 300° C. Because the particle size of the material employed in preparing the mixture is less than one micron and because of the fact that the sodium aluminate is added as a water solution to the alpha-alumina powder, the resulting beta-alumina sintered bodies are consistently of superior homogeneity and mechanical strength.

Those skilled in the art will understand that the new results of this invention can be obtained in operations which constitute substantial departures from the specific conditions stated in the foregoing descriptions of our actual practice of this invention. Thus, other methods of compaction may be employed to produce green bodies of virtually any desired size and shape which can be sintered to provide beta-alumina electrolytes or other articles. Likewise, a binder other than polyvinyl alcohol may be used and the particle size of the powdered materials used may be substantially larger than that specified above but should not, however, be larger than 100 microns for consistently good results in terms of physical and electrical properties of the ultimate electrolyte bodies.

Having thus described this invention in such full, clear, concise and exact terms as to enable any person skilled in the art to which it apertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, part of the specifically described embodiments of the invention may be made without departing from the scope of the invention as set forth in what is claimed.

What we claim as new and desire to secure by Letters Patent of the United States is:

1. The method of preparing a beta-alumina body having special utility as a solid electrolyte which comprises the steps of preparing a substantially uniform, moist mixture of sodium meta-aluminate and alpha-alumina in powder form, compacting the resulting mixture to form a green body, and firing the green body under a dry atmosphere containing free oxygen at a temperature between 1600° C. and 1900° C. and thereby sintering the green body.

2. The method of claim 1 in which magnesia and yttria in powder form are incorporated in the mixture in an amount of from one percent to three percent and from 0.25 percent to 5 percent, respectively.

3. The method of claim 1 in which the said moist mixture is prepared by dissolving the sodium meta-aluminate in water and mixing the resulting solution with the alpha-alumina powder.

4. The method of claim 3 in which the alpha-alumina is of particle size less than 1 micron.

5. The method of claim 3 in which the water is an aqueous solution of magnesium chloride and yttrium chloride.

6. The method of claim 1 in which the atmosphere is air of dew point temperature below $-80°$ F.

7. The method of claim 1 in which the atmosphere is pure oxygen of dew point temperature below $-80°$ F.

8. The method of claim 1 in which the green body is fired at about 1825° C. for two hours.

9. The method of claim 1 in which the moist mixture is compacted by extruding it to produce a tubular green body.